US012784325B2

(12) United States Patent
Su et al.

(10) Patent No.: US 12,784,325 B2
(45) Date of Patent: Nov. 3, 2026

(54) ENHANCEMENT OF TEXTURE AND ALPHA CHANNELS IN MULTIPLANE IMAGES

(71) Applicant: DOLBY LABORATORIES LICENSING CORPORATION

(72) Inventors: Guan-Ming Su, Fremont, CA (US); Peng Yin, Ithaca, NY (US)

(73) Assignee: DOLBY LABORATORIES LICENSING CORPORATION

( * ) Notice: Subject to any disclaimer, the term of this patent is extended or adjusted under 35 U.S.C. 154(b) by 155 days.

(21) Appl. No.: 18/874,808

(22) PCT Filed: Jun. 26, 2023

(86) PCT No.: PCT/US2023/069096
§ 371 (c)(1),
(2) Date: Dec. 13, 2024

(87) PCT Pub. No.: WO2024/006710
PCT Pub. Date: Jan. 4, 2024

(65) Prior Publication Data

US 2025/0384612 A1 Dec. 18, 2025

Related U.S. Application Data

(60) Provisional application No. 63/357,669, filed on Jul. 1, 2022.

(30) Foreign Application Priority Data

Jul. 1, 2022 (EP) .................................... 22182507

(51) Int. Cl.
*G06T 15/00* (2011.01)
*G06T 3/40* (2006.01)
(Continued)

(52) U.S. Cl.
CPC ................ *G06T 15/04* (2013.01); *G06T 3/40* (2013.01); *G06T 15/205* (2013.01)

(58) Field of Classification Search
CPC .......... G06T 15/04; G06T 3/40; G06T 15/205
(Continued)

(56) References Cited

U.S. PATENT DOCUMENTS 11,601,636 B2 * 3/2023 Overbeck ............... G06T 15/04
11,699,263 B2 * 7/2023 Ziegler ..................... G06T 7/50
345/426
(Continued)

FOREIGN PATENT DOCUMENTS

WO 2021257992 A1 12/2021

OTHER PUBLICATIONS

Srinivasan et al., Pushing the Boundaries of View Extrapolation with Multiplane Images, May 1, 2019, 10 pages (Year: 2019).*
(Continued)

*Primary Examiner* — Thomas J Lett

(57) ABSTRACT

Image-processing technique directed at improving the quality of viewable images generated by rendering a multiplane image having a plurality of pixels and represented by a plurality of layers corresponding to different respective distances from the reference camera position. In an example embodiment, the image-processing technique includes one or more of the following operations: (A) for a first set of pixels, scaling respective weights of the layers to cause a sum of the scaled weights to be normalized to one; (B) for a second set of pixels, replacing respective alpha and texture values in the layers by the corresponding local average values; and (C) for a third set of pixels, scaling corresponding texture values in the layers such that, for the resulting viewable image rendered for the reference camera position, texture values of the third set match the respective texture
(Continued)

values of the source image captured from the reference camera position.

20 Claims, 13 Drawing Sheets

(51) Int. Cl.
*G06T 15/04* (2011.01)
*G06T 15/20* (2011.01)

(58) Field of Classification Search
USPC .......................................................... 345/582
See application file for complete search history.

(56) References Cited

U.S. PATENT DOCUMENTS

| | | | | |
|---|---|---|---|---|
| 11,704,778 | B2 * | 7/2023 | Carbonera Luvizon .. | G06T 5/10<br>382/275 |
| 2020/0226816 | A1 | 7/2020 | Kar | |

OTHER PUBLICATIONS

Tucker et al., "Single-view view synthesis with multiplane images", CVPR Jun. 2020, pp. 1-3, 3 pages.

* cited by examiner

300

Function: $\{W_i\}$ = alpha_to_weight( $\{A_i\}$ )
Input: alpha $\{A_i\}$
Output: weighting factor $\{W_i\}$

STEP-0: compute weighting factor from alpha value for all *D* layers $$W_i(x, y) = A_i \cdot \prod_{j=i+1}^{D-1} (1 - A_j(x, y))$$

FIG. 3A

302

Function: *C* = *reference_view_rendering*( $\{A_i\}$, $\{C_i\}$ )
Input: alpha $\{A_i\}$ and texture $\{C_i\}$
Output: rendered image *I*

STEP-1: compute weighting factor from alpha value for all *D* layers $\{W_i\}$ = *alpha_to_weight*( $\{A_i\}$ )

STEP-2: linear combining all textures with weighting factor.

$$C = \sum_{i=0}^{D-1} C_i W_i$$

FIG. 3B

600

Function: $\{\tilde{\boldsymbol{A}}_i^{(N)}\}$ = alpha_normalization( $\{\boldsymbol{A}_i\}$ )
Input: unnormalized alpha $\{\boldsymbol{A}_i\}$
Output: normalized alpha $\{\tilde{\boldsymbol{A}}_i^{(N)}\}$

STEP-1: compute weighting factor from alpha value for all *D* layers $\{\boldsymbol{W}_i\}$ = *alpha_to_weight*( $\{\boldsymbol{A}_i\}$ )

STEP-2: normalize weighting factor for pixels with non-zero sum in all *D* layers $$\tilde{\boldsymbol{W}}_i^{(N)}(x, y) = \frac{\boldsymbol{W}_i(x, y)}{\sum_{k=0}^{D-1} \boldsymbol{W}_k(x, y)} \text{ for pixel } (x,y) \text{ with } \sum_{k=0}^{D-1} \boldsymbol{W}_k(x, y) > 0$$

STEP-3: propagate normalized weighting factor to alpha channel $$\tilde{\boldsymbol{A}}_{D-1}^{(N)}(x, y) = \tilde{\boldsymbol{W}}_{D-1}^{(N)}(x, y)$$

for *i* = D-2 : -1 : 0

$$\tilde{\boldsymbol{A}}_i^{(N)}(x, y) = \frac{\tilde{\boldsymbol{W}}_i^{(N)}(x, y)}{\prod_{j=i+1}^{D-1} (1 - \tilde{\boldsymbol{A}}_i^{(N)}(x, y))}$$

end

FIG. 6

710

Function: $\{\tilde{\boldsymbol{A}}_i^{(L)}\}$ = *alpha_local_mean*( $\{\boldsymbol{A}_i\}$, B)

Input: alpha $\{\boldsymbol{A}_i\}$

*B*: block size for local sliding square window

Output: local average alpha $\{\tilde{\boldsymbol{A}}_i^{(L)}\}$ for $i = 0 : 1 : D\text{-}1$ $\tilde{\boldsymbol{A}}_i^{(L)}$ = *mean_filter*( $\{\boldsymbol{A}_i\}$ )

end

FIG. 7A

720

Function: $\{\tilde{\boldsymbol{C}}_i^{(L)}\}$ = *texture_local_mean*( $\{\boldsymbol{C}_i\}$, *B*)

Input: texture $\{\boldsymbol{C}_i\}$

*B*: block size for local sliding square window

Output: local average texture $\{\tilde{\boldsymbol{C}}_i^{(L)}\}$ for $i = 0 : 1 : D\text{-}1$ // for each layer for c = 0 : 1 : 2 // for each channel $\tilde{\boldsymbol{C}}_i^{(L)}(x, y, c)$ = *mean_filter*( $\boldsymbol{C}_i(x, y, c)$ )

end end

FIG. 7B

800

Function: $\{\tilde{\boldsymbol{A}}_i^{(HN)}\}, \{\boldsymbol{C}^{(HN)}\} = \textit{texture\_alpha\_refinement}(\{\tilde{\boldsymbol{A}}_i^{(N)}\}, \{\boldsymbol{C}_i\}, B_a, B_c)$ Input: normalized alpha $\{\tilde{\boldsymbol{A}}_i^{(N)}\}$ Texture $\{\boldsymbol{C}_i\}$ $B_a$, $B_c$: block size for local sliding square window for alpha and texture Output: refine alpha $\{\tilde{\boldsymbol{A}}_i^{(HN)}\}$ Refined texture $\{\boldsymbol{C}^{(HN)}\}$

STEP-1 local average results are computed.

$\{\tilde{\boldsymbol{A}}_i^{(L)}\}$ = alpha_local_mean( $\{\tilde{\boldsymbol{A}}_i^{(N)}\}, B_a$)

$\{\tilde{\boldsymbol{C}}_i^{(L)}\}$ = texture_local_mean( $\{\boldsymbol{C}_i\}, B_c$)

STEP-2 refine pixel with condition $\boldsymbol{C}^{(N)}(x, y, c) = 0$ and $R(x, y, c) > 0$ For each pixel (x,y,c), replace the alpha and texture if condition (A1) meets $$\tilde{\boldsymbol{A}}_i^{(H)}(x, y) = \begin{cases} \tilde{\boldsymbol{A}}_i^{(L)}(x, y) \text{ if } \boldsymbol{C}^{(N)}(x, y, c) = 0 \textit{ and } R(x, y, c) > 0 \\ \tilde{\boldsymbol{A}}_i^{(N)}(x, y) & o.w. \end{cases}$$

$$\tilde{\boldsymbol{C}}_i^{(H)}(x, y, c) = \begin{cases} \tilde{\boldsymbol{C}}_i^{(L)}(x, y, c) \text{ if } \boldsymbol{C}^{(N)}(x, y, c) = 0 \textit{ and } R(x, y, c) > 0 \\ \boldsymbol{C}_i(x, y, c) & o.w. \end{cases}$$

STEP-3 Update alpha texture $\{\tilde{\boldsymbol{A}}_i^{(HN)}\} = \textit{alpha\_normalization}(\{\tilde{\boldsymbol{A}}_i^{(H)}\})$ $\{\tilde{\boldsymbol{W}}_i^{(HN)}\} = \textit{alpha\_to\_weight}(\{\tilde{\boldsymbol{A}}_i^{(HN)}\})$ $\boldsymbol{C}^{(HN)} = \textit{reference\_view\_rendering}(\{\tilde{\boldsymbol{A}}_i^{(HN)}\}, \{\tilde{\boldsymbol{C}}_i^{(H)}\})$

FIG. 8

900

Function: $\{\tilde{C}_i^{(HS)}\} = texture\_scaling(\{\tilde{C}_i^{(H)}\}, \boldsymbol{R})$ Input: Refined Texture $\{\tilde{C}_i^{(H)}\}$ Reference image $\boldsymbol{R}$ Output: scaled texture $\{\tilde{C}_i^{(HS)}\}$

STEP-1 refine pixel condition $\boldsymbol{C}^{(HN)}(x, y, c) > 0$ *and* $\boldsymbol{R}(x, y, c) > 0$ For each pixel (x, y, c), replace the alpha and texture if the condition is met $$\{\tilde{C}_i^{(HS)}(x, y, c) = \begin{cases} \dfrac{\boldsymbol{R}(x, y, c)}{\boldsymbol{C}^{(HN)}(x, y, c)} \tilde{C}_i^{(H)}(x, y, c) & \text{if } \boldsymbol{C}^{(HN)}(x, y, c) > 0 \text{ and } \boldsymbol{R}(x, y, c) > 0 \\ \tilde{C}_i^{(H)}(x, y, c) & o.w. \end{cases}$$

FIG. 9

ENHANCEMENT OF TEXTURE AND ALPHA CHANNELS IN MULTIPLANE IMAGES

1. CROSS-REFERENCE TO RELATED APPLICATIONS

This application is a U.S. National Stage application under U.S.C. 371 of International Application No. PCT/US2023/069096, filed on Jun. 26, 2023, which claims the benefit of priority from U.S. Provisional Application Ser. No. 63/357,669, filed on 1 Jul. 2022, and European Application No. 22182507.8, filed on 1 Jul. 2022, each of which is incorporated by reference herein in its entirety.

2. FIELD OF THE DISCLOSURE

Various example embodiments relate generally to multiplane imaging (MPI) and, more specifically but not exclusively, to editing multiplane images.

3. BACKGROUND

Multiplane images embody a relatively new approach to storing volumetric content. MPI can be used to render both still images and video and represents a three-dimensional (3D) scene within a view frustum using, e.g., 32 planes of texture and transparency (alpha) information per camera. Example applications of MPI include computer vision and graphics, image editing, photo animation, robotics, and virtual reality.

BRIEF SUMMARY OF SOME SPECIFIC EMBODIMENTS

Disclosed herein are various embodiments of an image-processing technique directed at improving the quality of viewable images generated by rendering a multiplane image having a plurality of pixels and represented by a plurality of layers corresponding to different respective distances from the reference camera position. In an example embodiment, the image-processing technique includes one or more of the following operations: (A) for a first set of pixels, scaling respective weights of the layers to cause a sum of the scaled weights to be normalized to one; (B) for a second set of pixels, replacing respective alpha and texture values in the layers by the corresponding local average values; and (C) for a third set of pixels, scaling corresponding texture values in the layers such that, for the resulting viewable image rendered for the reference camera position, texture values of the third set match the respective texture values of the source image captured from the reference camera position.

According to an example embodiment, provided is an apparatus for enhancing a first multiplane image represented by a plurality of layers corresponding to different respective distances from a reference camera position, the apparatus comprising: at least one processor; and at least one memory including program code; and wherein the at least one memory and the program code are configured to, with the at least one processor, cause the apparatus at least to: for each pixel of a first set of pixels, scale respective weights of the layers to cause a sum of scaled weights to be equal to a predetermined fixed value; for each pixel of a second set of pixels, replace respective alpha and texture values in the layers by corresponding local average values; and for each pixel of a third set of pixels, scale corresponding texture values in the layers such that, for a resulting viewable image rendered for the reference camera position, texture values of each pixel of the third set match respective texture values of a reference image captured from the reference camera position.

According to another example embodiment, provided is a method for enhancing a first multiplane image represented by a plurality of layers corresponding to different respective distances from a reference camera position, the method comprising: for each pixel of a first set of pixels, scaling respective weights of the layers to cause a sum of scaled weights to be a predetermined fixed value, the scaling of the respective weights being performed with at least one processor and at least one memory including program code; for each pixel of a second set of pixels, replacing respective alpha and texture values in the layers by corresponding local average values, the replacing being performed with the at least one processor and the at least one memory; and for each pixel of a third set of pixels, scaling corresponding texture values in the layers such that, for a resulting viewable image rendered for the reference camera position, texture values of each pixel of the third set match respective texture values of a reference image captured from the reference camera position, the scaling of the corresponding texture values being performed with the at least one processor and the at least one memory.

According to yet another example embodiment, provided is a non-transitory computer-readable medium storing instructions that, when executed by a processor, cause the processor to perform operations comprising a method for enhancing a first multiplane image represented by a plurality of layers corresponding to different respective distances from a reference camera position, the method comprising: for each pixel of a first set of pixels, scaling respective weights of the layers to cause a sum of scaled weights to be a predetermined fixed value, the scaling of the respective weights being performed with at least one processor and at least one memory including program code; for each pixel of a second set of pixels, replacing respective alpha and texture values in the layers by corresponding local average values, the replacing being performed with the at least one processor and the at least one memory; and for each pixel of a third set of pixels, scaling corresponding texture values in the layers such that, for a resulting viewable image rendered for the reference camera position, texture values of each pixel of the third set match respective texture values of a reference image captured from the reference camera position, the scaling of the corresponding texture values being performed with the at least one processor and the at least one memory.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 3A-3B show pseudocodes that can be used to implement multiplane-image rendering according to an embodiment.

FIG. 6 shows a pseudocode that can be used to implement at least a first portion of the processing of the method of FIG. 4 according to an embodiment.

FIGS. 7A-7B show pseudocodes that can be used to implement local averaging in the method of FIG. 4 according to an embodiment.

FIG. 8 shows a pseudocode that can be used to implement at least a second portion of the processing of the method of FIG. 4 according to an embodiment.

FIG. 9 shows a pseudocode that can be used to implement at least a third portion of the processing of the method of FIG. 4 according to an embodiment.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

In the following description, numerous details are set forth, such as device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that these are merely examples. It will further be understood that the disclosed systems and methods can be used in any device in which there is a need to project light, for example, cinema, consumer, and other commercial projection systems, heads-up displays, virtual reality displays, and the like.

Video Coding According to Example Embodiments

Figure 1:
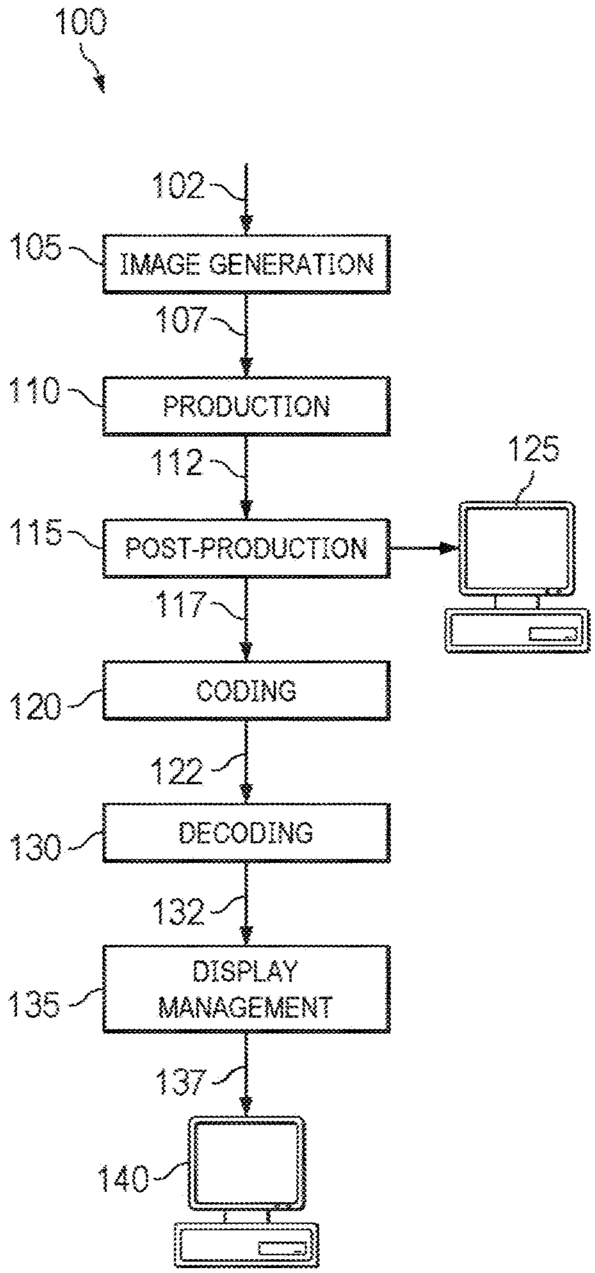
FIG. 1 depicts an example process for a video/image delivery pipeline.

FIG. 1 depicts an example process of a video delivery pipeline (100), showing various stages from video/image capture to video/image-content display according to an embodiment. A sequence of video/image frames (102) may be captured or generated using an image-generation block (105). The frames (102) may be digitally captured (e.g., by a digital camera) or generated by a computer (e.g., using computer animation) to provide video and/or image data (107). Alternatively, the frames (102) may be captured on film by a film camera. Then, the film may be translated into a digital format to provide the video/image data (107).

In a production phase (110), the data (107) may be edited to provide a video/image production stream (112). The data of the video/image production stream (112) may be provided to a processor (or one or more processors, such as a central processing unit, CPU) at a post-production block (115) for post-production editing. The post-production editing of the block (115) may include, e.g., adjusting or modifying colors or brightness in particular areas of an image to enhance the image quality or achieve a particular appearance for the image in accordance with the video creator's creative intent. This part of post-production editing is sometimes referred to as "color timing" or "color grading." Other editing (e.g., scene selection and sequencing, image cropping, addition of computer-generated visual special effects, removal of artifacts, etc.) may be performed at the block (115) to yield a "final" version (117) of the production for distribution. Enhancement of texture and alpha channels in multiplane images disclosed herein below may be performed at the block (115). During the post-production editing (115), video and/or images may be viewed on a reference display (125).

Following the post-production (115), the data of the final version (117) may be delivered to a coding block (120) for being further delivered downstream to decoding and playback devices, such as television sets, set-top boxes, movie theaters, and the like. In some embodiments, the coding block (120) may include audio and video encoders, such as those defined by the ATSC, DVB, DVD, Blu-Ray, and other delivery formats, to generate a coded bitstream (122). In a receiver, the coded bitstream (122) is decoded by a decoding unit (130) to generate a corresponding decoded signal (132) representing a copy or a close approximation of the signal (117). The receiver may be attached to a target display (140) that may have somewhat or completely different characteristics than the reference display (125). In such cases, a display management (DM) block (135) may be used to map the decoded signal (132) to the characteristics of the target display (140) by generating a display-mapped signal (137). Depending on the embodiment, the decoding unit (130) and display management block (135) may include individual processors or may be based on a single integrated processing unit.

Multiplane Imaging

A multiplane image comprises multiple image planes, with each of the image planes being a "snapshot" of the 3D scene at a certain depth with respect to the camera position. Information stored in each plane includes the texture information (e.g., represented by the R, G, B values) and transparency information (e.g., represented by the alpha (A) values). Herein, the acronyms R, G, B stand for red, green, and blue, respectively. There are different ways in which a multiplane image can be generated. For example, two or more input images from two or more cameras located at different known viewpoints can be co-processed to generate a corresponding multiplane image. Alternatively, single-view synthesis of a multiplane image can be performed using a source image captured by a single camera. For at least some multiplane-image generation algorithms, the corresponding multiplane images, when rendered on the reference display (125) or the target display (140), may disadvantageously exhibit one or more types of artifacts. Various embodiments disclosed herein may beneficially be used to reduce the appearance of such artifacts and/or to substantially fully suppress such artifacts.

Figure 2:
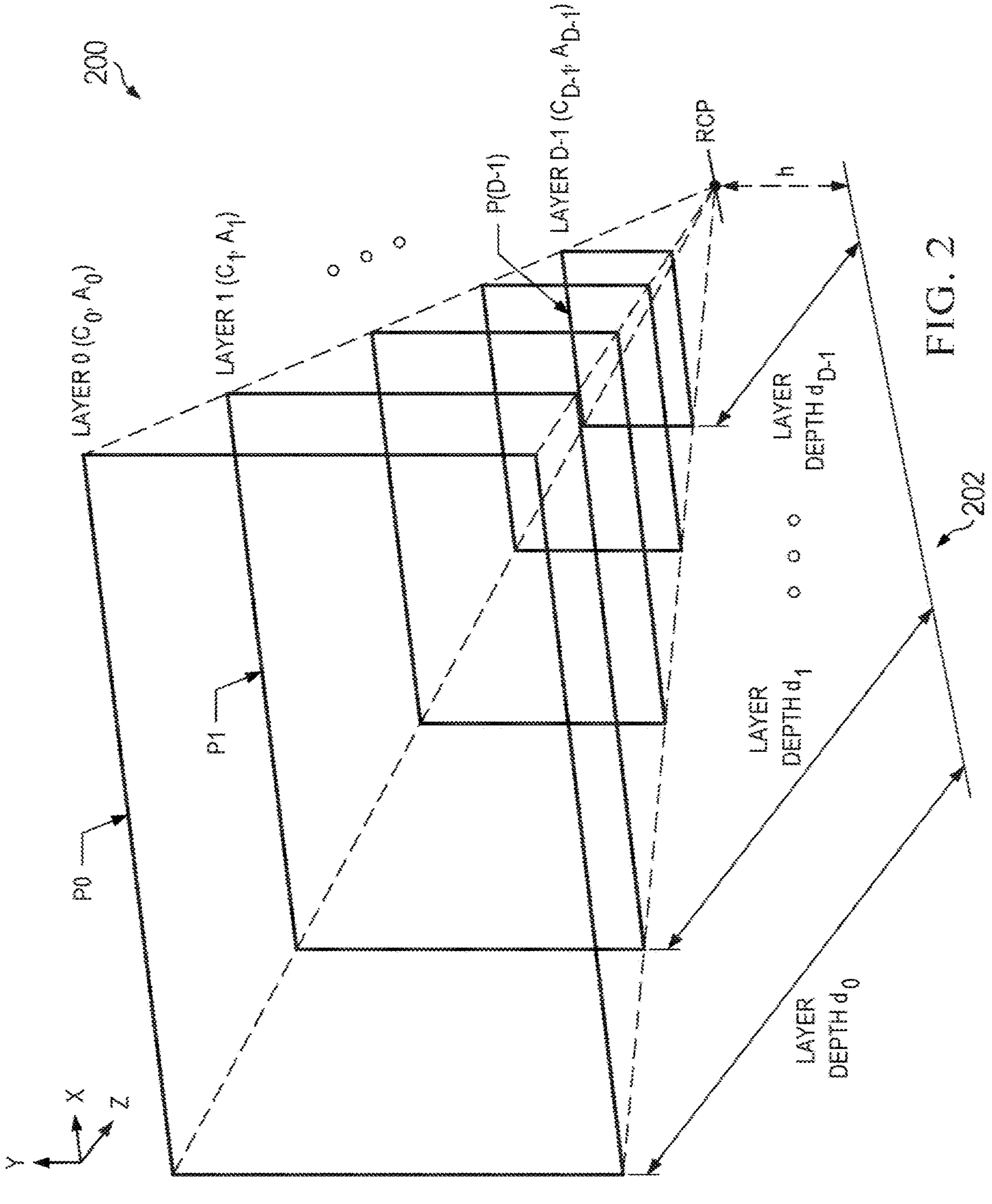
FIG. 2 pictorially illustrates a 3D-scene representation using a multiplane image according to an embodiment.

FIG. 2 pictorially illustrates a 3D scene representation using a multiplane image (200) according to an embodiment. The multiplane image (200) has D planes or layers (P0, P1, . . . , P(D−1)), where D is an integer greater than one. The planes (layers) are indexed such that the most remote layer, from the reference camera position (RCP), is indexed as the 0-th layer and is at a distance (or depth) do from the RCP along the Z dimension of the 3D scene. The index is incremented by one for each next layer located closer to the RCP. The plane (layer) that is the closest to the RCP has the index value (D−1) and is at a distance (or depth) $d_{D-1}$ from the RCP along the Z dimension. Each of the planes (P0, P1, . . . , P(D−1)) is orthogonal to a base plane (202) which is parallel to the XZ-coordinate plane. The RCP is at a vertical height h above the base plane (202). The XYZ triad shown in FIG. 2 indicates the general orientation of the multiplane image (200) and the planes (P0, P1, . . . , P(D−1)) with respect to the X, Y, and Z dimensions of the 3D scene.

Let us denote the RGB values for the $i^{th}$ layer as $C_i$, with the lateral size of the layer being HxW, where H is the height (Y dimension) and W is the width (X dimension) of the layer. The pixel value (x, y) for the color channel c is denoted as $C_i(x, y, c)$. The a value for the $i^{th}$ layer is denoted as $A_i$, and the corresponding pixel value (x, y) for the alpha channel is denoted as $A_i$ (x, y). The depth distance from the $i^{th}$ layer to the reference camera position (RCP) is denoted as $d_i$. The source image from the original reference view (with the camera being fixed at the RCP) is denoted as R, with the texture pixel value being denoted R(x, y, c). Note that in MPI, the effective distance between two adjacent layers typically has a fixed value, e.g., the different layers (P0, P1, . . . , P(D−1)) of the multiplane image (200) are equidistantly spaced in disparity (inverse depth).

As already indicated above, a multiplane image, such as the multiplane image (200), can be generated using single-view synthesis from a single source image R or using multiple-view synthesis from two or more source images. Such syntheses may be performed, e.g., during the production phase (110). The corresponding MPI synthesis algorithm(s) may typically output the multiplane image (200) containing XYZ-resolved pixel values in the form $\{(C_i, A_i)$ for i=0, . . . , D−1$\}$.

By processing the multiplane image (200) represented by $\{(C_i, A_i)$ for i=0, . . . , D−1$\}$, an MPI-rendering algorithm can generate a viewable image corresponding to the RCP or to a new virtual camera position that is different from the RCP. An example MPI-rendering algorithm (often referred to as the "MPI viewer") that can be used for this purpose may include the steps of warping and compositing. Other suitable MPI viewers may also be used. The rendered multiplane image (200) can be viewed, e.g., on the reference display (125).

During the warping step of the MPI-rendering algorithm, each layer $(C_i, A_i)$ of the multiplane image (200) may be warped from the RCP viewpoint position $(v_s)$ to a new viewpoint position $(v_t)$, e.g., as follows:

$$C_i^t = T_{v_s,v_t}(\sigma d_i, C_i) \tag{1}$$

$$A_i^t = T_{v_s,v_t}(\sigma d_i, A_i) \tag{2}$$

where $T_{v_s,v_t}(\ )$ is the warping function; and σ is the consistent scale (to minimize error). In an example embodiment, the warping function $T_{v_s,v_t}(\ )$ can be expressed as follows:

$$\begin{bmatrix} u_s \\ v_s \\ 1 \end{bmatrix} = K_s\left(R - \frac{tn^T}{a}\right)(K_t)^{-1}\begin{bmatrix} u_t \\ v_t \\ 1 \end{bmatrix} \tag{3}$$

where $v_s=(u_s, v_s)$ and $v_t=(u_t, v_t)$. The functions $K_s$ and $K_t$ represent the intrinsic camera model for the reference view and the target view, respectively. The functions R and t represent the extrinsic camera model for rotation and translation, respectively. n denotes the normal vector $[0\ 0\ 1]^T$. a denotes the distance to a plane that is fronto-parallel to the source camera at depth $\sigma d_i$.

During the compositing step of the MPI-rendering algorithm, a new viewable image $C^t$ can be generated, e.g., using processing operations corresponding to the following equations:

$$C^t = \sum_{i=0}^{D-1} C_i^t W_i^t \tag{4}$$

where the weights $$W_i^t$$

are expressed as:

$$W_i^t = \left(A_i^t \cdot \prod_{j=i+1}^{D-1} (1 - A_j^t)\right) \tag{5}$$

The disparity map $D^s$ corresponding to the source view can be computed as:

$$D^s = \sum_{i=0}^{D-1} d_i^{-1} W_i^s \tag{6}$$

where the weights $$W_i^s$$

are expressed as:

$$W_i^s = A_i \cdot \prod_{j=i+1}^{D-1} (1 - A_j)\Big) \tag{7}$$

The MPI-rendering algorithm can also be used to generate the viewable image $C^S$ corresponding to the RCP. In this case, the warping step is omitted, and the image $C^S$ is computed as:

$$C^s = \sum_{i=0}^{D-1} C_i W_i^s \tag{8}$$

FIGS. 3A-3B show pseudocodes (300, 302) that can be used to implement Eq. (8) according to an embodiment. More specifically, the pseudocode (300) defines a first function that can be called to generate the weights $$W_i^s$$

based on the alpha values of the multiplane image (200). The pseudocode (302) defines a second function C that can be called to render the image $C^S$. The pseudocode (302) calls the first function at the "STEP-1" thereof. In some cases, the weights $\{W_i\}$ may be known from some other processing. In such cases, the pseudocode (300) need not be called during the execution of the pseudocode (302).

In an example embodiment, the post-production editing (115) includes processing directed at adjusting the image $C^S$ such that any differences between the latter and the source image R, from which the corresponding multiplane image (200) was generated, are approximately minimized. In mathematical terms, the goal of such processing may be formulated as follows. The processing is used to convert the values $\{(C_i, A_i)$ for $i=0, \ldots, D-1\}$ to the values $\{(C_i, A_i)$ for $i=0, \ldots, D-1\}$. Upon such conversion, the resulting rendered view $\tilde{C}^S$ corresponding to the reference camera position (RCP) is given by Eq. (9):

$$\tilde{C}^s = \sum_{i=0}^{D-1} \tilde{C}_i \tilde{W}_i^s \quad (9)$$

where the weight $$\tilde{W}_i^s$$

are expressed as:

$$\tilde{W}_i^s = \tilde{A}_i \cdot \prod_{j=i+1}^{D-1} \left(1 - \tilde{A}_j\right) \quad (10)$$

An optimization criterion for finding a suitable "optimal" conversion algorithm may then be formulated using Eq. (11) as follows:

$$\left\{\tilde{C}_i^{opt}, \tilde{A}_i^{opt}\right\} = \min_{\{\tilde{C}_i, \tilde{A}_i\}} \left\|\tilde{C}^s - R\right\|^2 \quad (11)$$

It should be noted however that Eq. (11) represents an underdefined problem as the field of adjustable parameters therefor is too large for a deterministic solution. As such, introduction of additional (e.g., implicit) constrains is used to obtain an approximately optimal solution according to various disclosed embodiments. Validity of such additional constrains has been verified experimentally, and representative results according to various example embodiments are described below in reference to FIGS. 10-11.

Post-Production Editing of Multiplane Images

Figure 4:
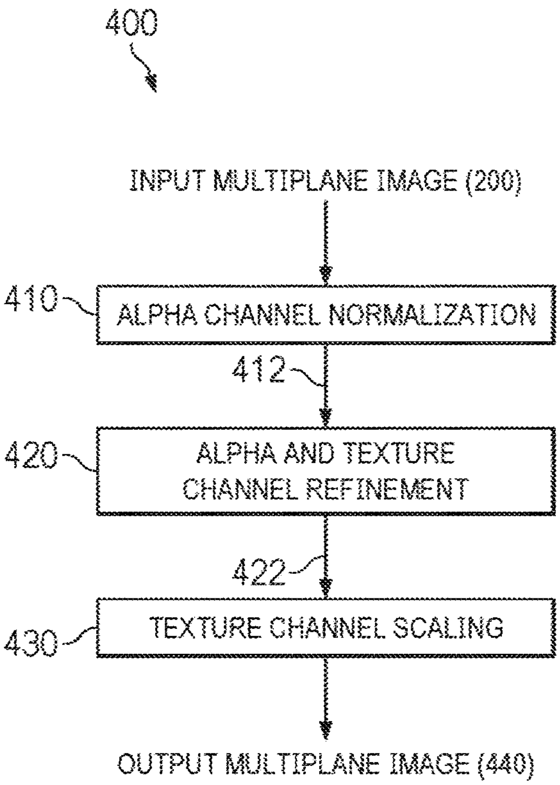
FIG. 4 is a flowchart illustrating a method of editing a multiplane image according to an embodiment.

FIG. 4 is a flowchart illustrating a method (400) of editing a multiplane image (200) according to an embodiment. The method (400) uses, as an input, the multiplane image (200), which can be generated, e.g., as previously described. The editing method (400) is applied to process the input multiplane image (200), thereby converting the latter into a corresponding output multiplane image (440). When the multiplane image (440) is rendered using an MPI-rendering algorithm, e.g., as described above, the appearance of artifacts in the corresponding viewable image may beneficially be reduced or fully suppressed compared to that in a similar rendering of the input multiplane image (200).

The method (400) includes a first processing block (410), wherein the alpha channel of the multiplane image (200) is subjected to normalization processing. A resulting multiplane image (412) is applied to a second processing block (420) of the method (400), wherein the alpha and texture channels of the image (412) are subjected to alpha- and texture-channel refinement processing. A resulting multiplane image (422) is applied to a third processing block (430) of the method (400), wherein the texture channel of the image (422) is subjected to scaling processing. The output of the third processing block (430) is the multiplane image (440). Example embodiments of the processing blocks (410, 420, 430) are described in more detail below.

In some embodiments of the method (400), one of the processing blocks (410, 420, 430) may be absent. In some other embodiments of the method (400), two of the processing blocks (410, 420, 430) may be absent. In some embodiments of the method (400), the order in which the processing blocks (410, 420, 430) are executed may be different from the order indicated in FIG. 4.

Alpha-Channel Normalization

One example artifact type that may be observed upon the rendering of a multiplane image (200) is a "dark pixel" artifact. Analyses of the alpha channel values $\{A_i(x, y)\}$ corresponding to the "dark pixel" artifacts reveal that the alpha channel values for the pixels corresponding to such artifacts are significantly lower than those for the pixels without the artifact in the same multiplane-image layer, whereas the texture channels have similar range of values for both sets of pixels. A similar trend manifests itself in the weights space $$\{\tilde{W}_i^s(x, y)\}.$$

FIGS. 5A-5D graphically illustrate example analysis results illustrating certain characteristics of the "dark pixel" artifact according to an embodiment. The performed analysis includes, for each pixel location (x, y), computing the mean of absolute difference (MAD) between the source image R and the rendered image in accordance with Eq. (12):

$$MAD(x, y, c) = \tilde{C}^S(x, y, c) - R(x, y, c) \quad (12)$$

The performed analysis further includes, for each pixel location (x, y), computing a sum $$\overline{W}_i^s(x, y)$$

of the weights in accordance with Eq. (13):

$$\overline{W}_i^s(x, y) = \sum_{i=0}^{D-1} \tilde{W}_i^s(x, y) \quad (13)$$

Figure 5A:
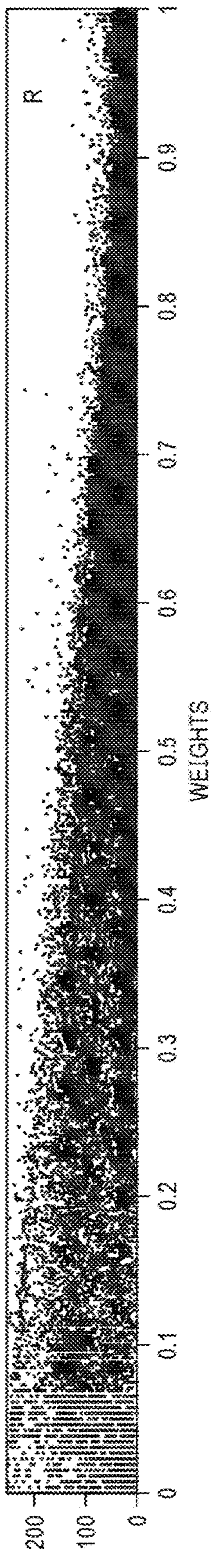
FIGS. 5A-5D graphically illustrate analysis results corresponding to an example artifact according to an embodiment.
Figure 5B:
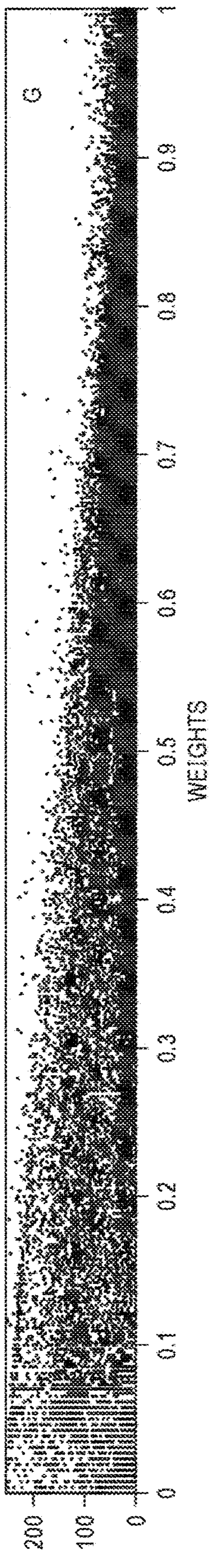
Figure 5C:
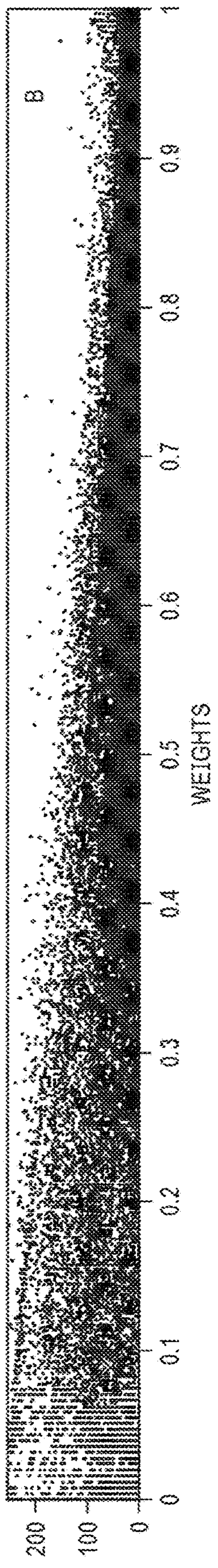
Figure 5D:
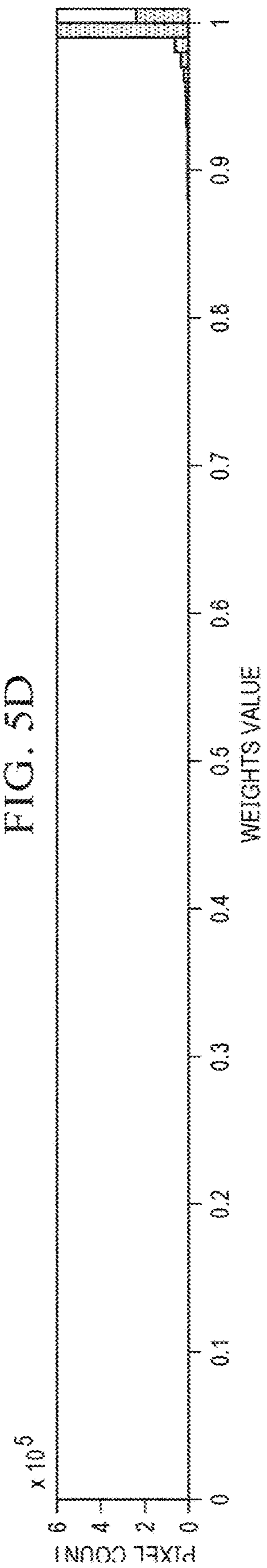

FIGS. 5A-5C show the scatter plots of the computed MAD(x, y, c) versus $$\overline{W}_i^s(x, y)$$

for the color sub-channels R, G, and B, respectively, of the texture channel. FIG. 5D shows the corresponding histogram of $$\left\{\overline{W}_i^s(x, y)\right\}.$$

As can be observed in FIG. 5D, most of the values of the weights $$\overline{W}_i^s(x, y)$$

are clustered around 1. When $$\overline{W}_i^s(x, y)$$

becomes smaller, the distribution of MAD(x, y, c) becomes wider and the error between the source and rendered images becomes larger, which is evident from the scatter plots of FIGS. 5A-5C. The analysis results graphically shown in FIGS. 5A-5D suggest that correcting the value of $$\{\overline{W}_i^s(x, y)\}$$

(and thereby $\tilde{A}_i$ as well) can improve the quality of the rendered image.

If the multiplane image (440) is constructed with an intent to match the source image R when rendering at the reference camera position (RFC, FIG. 2), then the following equation is approximately satisfied for the pixel location (x, y) with the optimal parameters $$\tilde{C}_i^{opt}(x, y, c) \text{ and } \tilde{W}_i^{opt}(x, y):$$

$$R(x, y, c) = \tilde{C}_i^{s,opt}(x, y, c) = \sum_{i=0}^{D-1} \tilde{W}_i^{opt}(x, y)\tilde{C}_i^{opt}(x, y, c) \quad (14)$$

For most pixels without an artifact, the weights $$\overline{W}_i^s(x, y)$$

are close to 1 (e.g., see FIG. 5D). Based on this observation, the processing block (410) is configured to normalize the weights $$\overline{W}_i^s(x, y)$$

to 1. The normalization condition can be expressed as follows:

$$\sum_{i=0}^{D-1} \tilde{W}_i^{opt}(x, y) = 1 \quad (15)$$

Eq. (15) may be used to set a first example constraint for approximately solving the optimization problem formulated with Eq. (11).

In an example embodiment of the processing block (410), normalization of the weights $W_i(x, y)$ for pixel (x, y) can be carried in accordance with Eq. (16):

$$\tilde{W}_i^{(N)}(x, y) = \frac{W_i(x, y)}{\sum_{k=0}^{D-1} W_k(x, y)} \quad (16)$$

where $$\tilde{W}_i^{(N)}(x, y)$$

denotes the normalized weights. Eq. (16) is conditionally applicable to layers i=0, . . . , D−1, and any pixel (x, y) satisfying the condition $$\sum_{k=0}^{D-1} W_k(x, y) > 0,$$

to avoid division by 0 in Eq. (16).

In an example embodiment of the processing block (410), the modified alpha values $$\left\{\tilde{A}_i^{(N)}(x, y)\right\}$$

corresponding to the normalized weights $$\left\{\tilde{W}_i^{(N)}(x, y)\right\}$$

can be computed by recursive backpropagation based on Eq. (17):

$$\tilde{W}_i^{(N)}(x, y) = \tilde{A}_i^{(N)}(x, y)\prod_{j=i+1}^{D-1}\left(1-\tilde{A}_i^{(N)}(x, y)\right) \quad (17)$$

Eqs. (18a)-(18e) provide explicit forms of Eq. (17) for different layers of the corresponding multiplane image, from layer (D−1) to layer 0:

$$\tilde{W}_{D-1}^{(N)}(x, y) = \tilde{A}_{D-1}^{(N)}(x, y) \quad (18a)$$

$$\tilde{W}_{D-2}^{(N)}(x, y) = \tilde{A}_{D-2}^{(N)}(x, y)\left(1-\tilde{A}_{D-1}^{(N)}(x, y)\right) \quad (18b)$$

$$\tilde{W}_{D-3}^{(N)}(x, y) = \tilde{A}_{D-3}^{(N)}(x, y)\left(1-\tilde{A}_{D-2}^{(N)}(x, y)\right)\left(1-\tilde{A}_{D-1}^{(N)}(x, y)\right) \quad (18c)$$

$$\tilde{W}_{D-4}^{(N)}(x, y) = \tilde{A}_{D-4}^{(N)}(x, y)\left(1-\tilde{A}_{D-3}^{(N)}(x, y)\right)\left(1-\tilde{A}_{D-2}^{(N)}(x, y)\right)\left(1-\tilde{A}_{D-1}^{(N)}(x, y)\right) \quad (18d)$$

$$\ldots$$

$$\tilde{W}_0^{(N)}(x, y) = \tilde{A}_0^{(N)}(x, y)\prod_{j=i}^{D-1}\left(1-\tilde{A}_i^{(N)}(x, y)\right) \quad (18e)$$

Starting from Eq. (18a), the modified alpha values for the $(D-1)^{th}$ layer can be computed using Eq. (19):

$$\tilde{A}_{D-1}^{(N)}(x, y) = \tilde{W}_{D-1}^{(N)}(x, y) \quad (19)$$

Once the $$\tilde{A}_{D-1}^{(N)}(x, y)$$

values are computed, the modified alpha values for the $(D-2)^{th}$ layer can be computed based on Eq. (18b) as follows:

$$\tilde{A}_{D-2}^{(N)}(x, y) = \frac{\tilde{W}_{D-2}^{(N)}(x, y)}{\left(1-\tilde{A}_{D-1}^{(N)}(x, y)\right)} \tag{20}$$

Once the $$\tilde{A}_{D-2}^{(N)}(x, y)$$

values are computed, the modified alpha values for the $(D-3)^{th}$ layer can be computed based on Eq. (18c) as follows:

$$\tilde{A}_{D-3}^{(N)}(x, y) = \frac{\tilde{W}_{D-2}^{(N)}(x, y)}{\left(1-\tilde{A}_{D-2}^{(N)}(x, y)\right)\left(1-\tilde{A}_{D-1}^{(N)}(x, y)\right)} \tag{21}$$

A person of ordinary skill in the pertinent art will readily understand that the recursive backpropagation procedure exemplified by Eqs. (20), (21) can be repeated for the remaining layers. Eq. (22) provides the final formula of the recursive backpropagation procedure according to an embodiment:

$$\tilde{A}_{0}^{(N)}(x, y) = \frac{\tilde{W}_{o}^{(N)}(x, y)}{\prod_{j=1}^{D-1}\left(1-\tilde{A}_{i}^{(N)}(x, y)\right)} \tag{22}$$

FIG. 6 shows a pseudocode (600) that can be used to implement at least some of the processing of the processing block (410) according to an embodiment. The pseudocode (600) includes three code blocks, labeled STEP-1, STEP-2, and STEP-3, respectively. STEP-1 carries out the conversion of alpha-channel values into weights. In an example embodiment, STEP-1 of the pseudocode (600) can be implemented using the pseudocode (300) (see FIG. 3A). STEP-2 computes the normalized weights $$\left\{\tilde{W}_{i}^{(N)}(x, y)\right\}.$$

In an example embodiment, STEP-2 of the pseudocode (600) can be implemented based on Eq. (16). STEP-3 returns the modified alpha-channel values $$\tilde{A}_{i}^{(N)}(x, y).$$

In an example embodiment, STEP-3 of the pseudocode (600) can be implemented using the recursive backpropagation defined by Eqs. (19)-(22).

Alpha- and Texture-Channel Refinement

Although the processing implemented in the first processing block (410) of the method (400) alone is capable of removing a relatively large number of artifacts, some types of artifacts still persist after the processing thereof is completed. One of such artifacts is a "black hole" artifact for which the RGB pixel value for the corresponding pixel in the viewable image generated by rendering the multiplane image (412) is nulled, i.e., is (0,0,0), whereas the source image R does not have any features therein that might cause the null value. It should be noted that a "black hole" artifact typically appears as an isolated small "hole" and does not occur in large quantities.

Since the rendered pixel value is a weighted linear combination of the corresponding pixel values from D layers, and both weights $$\left(\tilde{W}_{i}^{(N)}(x, y)\right)$$

and texture-channel values ($C_i(x, y, c)$) in all D layers are non-negative, the corresponding mathematical Equations (23), (24) are irreconcilable:

$$C^{(N)}(x, y, c) = \sum_{i=0}^{D-1} \tilde{W}_{i}^{(N)}(x, y)C_i(x, y, c) = 0 \tag{23}$$

$$R(x, y, c) > 0 \tag{24}$$

In other words, the result expressed by Eq. (24) is not achievable by way of Eq. (23) with positive weights and texture-channel values. In an example embodiment, the second processing block (420) of the method (400) addresses this problem by employing local averaging as further detailed below. The disclosed local averaging is beneficially capable of substantially removing at least the "black hole" artifacts.

FIGS. 7A-7B show pseudocodes (710, 720) that can be used to implement local averaging in the second processing block (420) of the method (400) according to an embodiment. More specifically, the pseudocode (710) of FIG. 7A is configured to perform local averaging for the alpha channel. The pseudocode (720) of FIG. 7B is similarly configured to perform local averaging for the texture channel.

Both of the pseudocodes (710, 720) employ a mean filter, which is a filter computing an average value within a sliding window. In some embodiments, the size $B_a$ of the sliding window used for the pseudocode (710) may be different from the size $B_c$ of the sliding window used for the pseudocode (720). For example, the sliding window sizes may be $B_a$=19 and $B_c$=9. In some other embodiments, the sliding-window sizes may be the same. The local channel averages computed using the pseudocodes (710, 720) can be represented as follows:

$$\{\tilde{A}_i^{(L)}\} = \text{alpha\_local\_mean}\left(\{\tilde{A}_i^{(N)}\}, B_a\right) \tag{25}$$

$$\{\tilde{C}_i^{(L)}\} = \text{texture\_local\_mean}\left(\{C_i\}, B_c\right) \tag{26}$$

FIG. 8 shows a pseudocode (800) that can be used to implement at least some of the processing of the processing block (420) according to an embodiment. The pseudocode (800) includes three code blocks, labeled STEP-1, STEP-2, and STEP-3, respectively. STEP-1 of the pseudocode (800) is configured to perform the local averaging corresponding to Eqs. (25), (26) and can be implemented using the pseudocodes (710, 720) (see FIG. 7A, 7B). STEP-2 of the pseudocode (800) is configured to (i) search for "black hole" artifacts and (ii) use the corresponding local averages to replace the "black hole" pixel values by the corresponding local averages computed at STEP-1 of the pseudocode (800).

The "black hole" artifact condition that can be used to implement the search (i) of STEP-2 can be expressed as follows:

$$C^{(N)}(x, y, c) = 0 \text{ and } R(x, y, c) > 0 \tag{27}$$

The pixel-value replacement (ii) of STEP-2 causes conversion of the alpha-channel values $$\tilde{A}_i^{(N)}(x, y)$$

and the texture-channel values $C_i$(x, y, c) into the corresponding refined values $$\tilde{A}_i^{(H)}(x, y) \text{ and } \tilde{C}_i^{(H)}(x, y, c),$$

respectively. Eqs. (28), (29) provide example mathematical formulas for implementing such refinement:

$$\tilde{A}_i^{(H)}(x, y) = \begin{cases} \tilde{A}_i^{(L)}(x, y) & \text{if } C^{(N)}(x, y, c) = 0 \text{ and } R(x, y, c) > 0 \\ \tilde{A}_i^{(N)}(x, y) & \text{otherwise} \end{cases} \tag{28}$$

$$\tilde{C}_i^{(H)}(x, y, c) = \begin{cases} \tilde{C}_i^{(L)}(x, y, c) & \text{if } C^{(N)}(x, y, c) = 0 \text{ and } R(x, y, c) > 0 \\ C_i(x, y, c) & \text{otherwise} \end{cases} \tag{29}$$

STEP-3 of the pseudocode (800) may include the pseudocodes (300, 302) being applied to the refined values $$\tilde{A}_i^{(H)}(x, y) \text{ and } \tilde{C}_i^{(H)}(x, y, c)$$

generated at STEP-2 of the pseudocode (800). More specifically, first, the alpha-channel values $$\tilde{A}_i^{(H)}(x, y)$$

are subjected to normalization to generate the corresponding normalized values $$\{\tilde{A}_i^{(HN)}\}.$$

Second, the weights $$\{\tilde{W}_i^{(HN)}\}$$

are computed using the updated alpha channel $$\{\tilde{A}_i^{(HN)}\}.$$

Third, the corresponding composed multiplane image $$\{\tilde{A}_i^{(HN)}\}, \{\tilde{C}_i^{(H)}\}$$

may be rendered to generate a viewable image $C^{(HN)}$.

Texture-Channel Scaling

FIG. 9 shows a pseudocode (900) that can be used to implement at least some of the processing of the processing block (430) according to an embodiment. As illustrated below in FIGS. 11A-11B, the processing of the processing block (430) in general and of the pseudocode (900) in particular can beneficially be used to reduce object-boundary artifacts in the viewable images generated by rendering the output multiplane image (440). The processing of the processing block (430) may also reduce blurring in some parts of the viewable images.

The inputs for the pseudocode (900) may include the source image R and the refined texture-channel values $$\tilde{C}_i^{(H)}(x, y, c)$$

computed at STEP-2 of the pseudocode (800). The scaling operation of the pseudocode (900) is selectively applied to the pixels of the viewable image $C^{(HN)}$ for which the following condition is met:

$$C^{(HN)}(x, y, c) > 0 \text{ and } R(x, y, c) > 0 \tag{30}$$

As already indicated above, the viewable image $C^{(HN)}$ may be computed at STEP-3 of the pseudocode (800).

The effect of the scaling factor, #, applied in the pseudocode (900) may be more clearly illustrated by Eq. (31):

$$\beta C^{(HN)}(x, y, c) = R(x, y, c) \tag{31}$$

More specifically, Eq. (31) explicitly shows that the scaling factor β is selected such that, after the scaling, the scaled pixel values of the viewable image $C^{(HN)}$ are the same as the corresponding pixel values of the source image R. Rearrangement of Eq. (31) provides a formula for computing the scaling factor β, which is as follows:

$$\beta = \frac{R(x, y, c)}{C^{(HN)}(x, y, c)} \tag{32}$$

The processing of the pseudocode (900) is configured to replace the pixel values satisfying the condition (30) by the corresponding scaled pixel values. The pixel values that do not satisfy the condition (30) remain unchanged. Eq. (33) provides an example mathematical formula for such conditional scaling:

$$\tilde{C}_i^{(HS)}(x, y, c) = \begin{cases} \frac{R(x, y, c)}{C^{(HN)}(x, y, c)} \tilde{C}_i^{(H)}(x, y, c) & \text{if } C^{(HN)}(x, y, c) = 0 \text{ and } R(x, y, c) > 0 \\ \tilde{C}_i^{(H)}(x, y, c) & \text{otherwise} \end{cases} \tag{33}$$

This formula may be used for the pseudocode (900) as indicated in FIG. 9.

Examples of Improvements

Figure 10A:
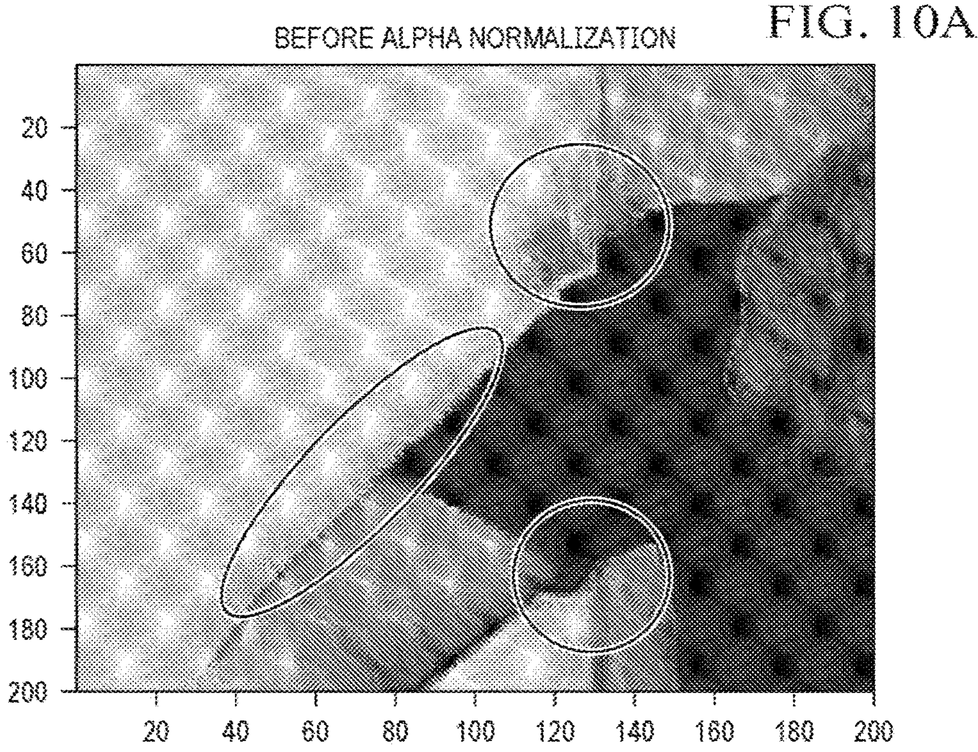
FIGS. 10A-10B illustrate example visual improvements corresponding to a processing block of the method of FIG. 4 according to an embodiment.
Figure 10B:
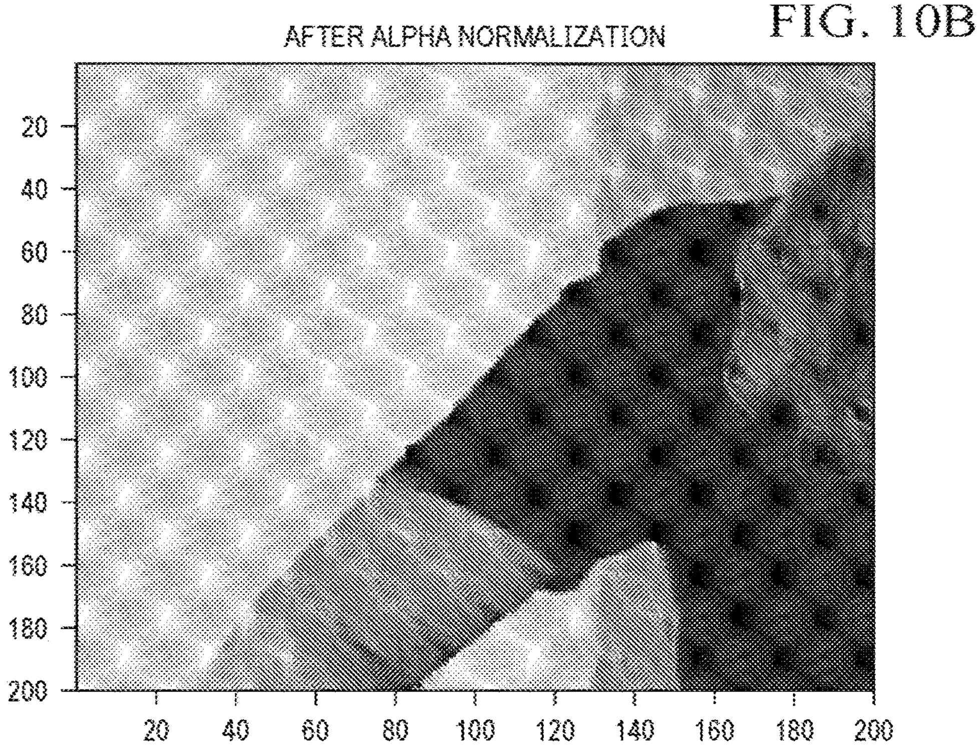

FIGS. 10A-10B illustrate example visual improvements corresponding to the first processing block (410) of the method (400) according to an embodiment. More specifically, FIG. 10A shows a portion of the viewable image generated by rendering the input multiplane image (200) depicting a playing violinist. The above-described "dark pixel" artifacts are clearly visible therein within the outlined areas around the violinist's upper arm. FIG. 10B shows the same portion of the viewable image generated by rendering the multiplane image (412). Comparison of the outlined areas of the image shown in FIG. 10A with the corresponding areas of the image shown in FIG. 10B provides a visual indication of the extent to which the "dark pixel" artifacts can be corrected by the alpha-channel normalization of the first processing block (410) of the method (400).

Figure 11A:
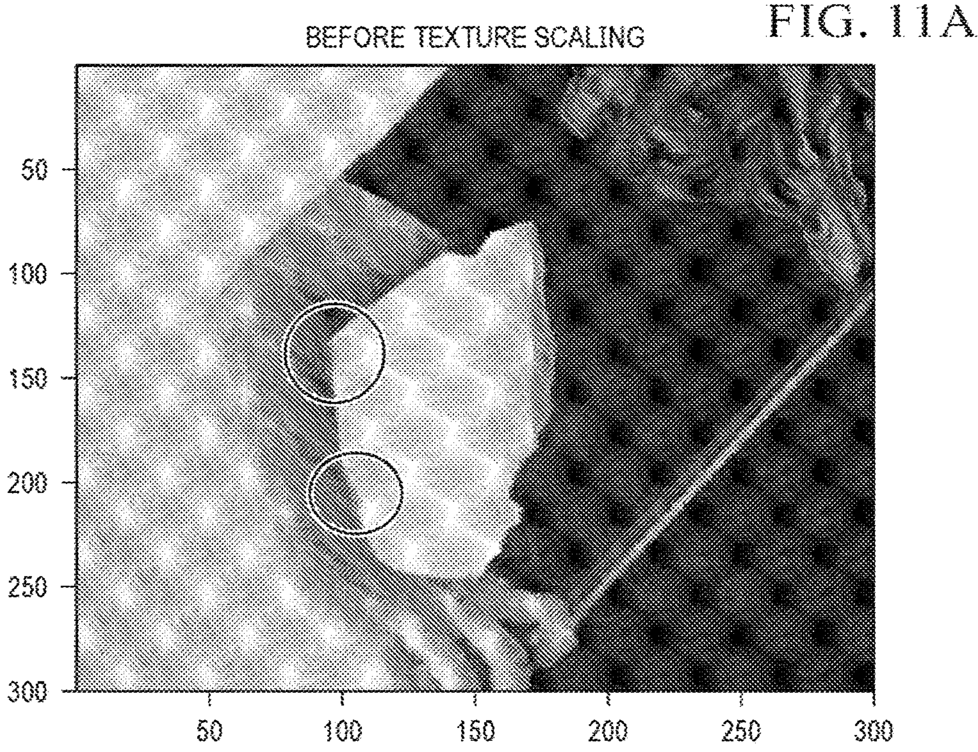
FIGS. 11A-11B illustrate example visual improvements corresponding to another processing block of the method of FIG. 4 according to an embodiment.
Figure 11B:
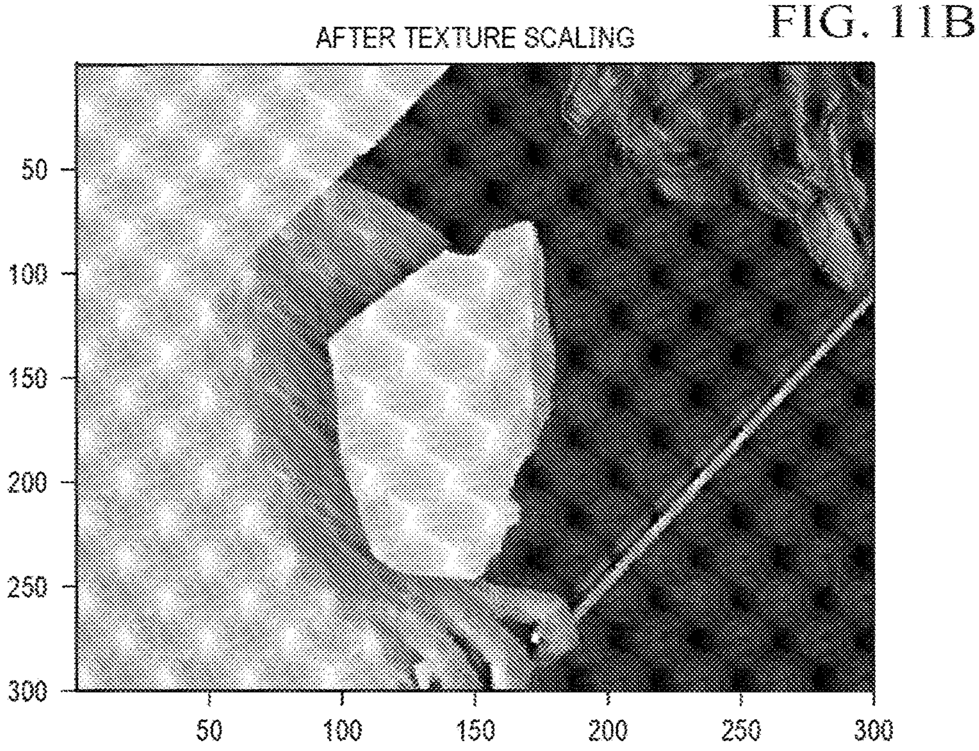

FIGS. 11A-11B illustrate example visual improvements corresponding to the third processing block (430) of the method (400) according to an embodiment. More specifically, FIG. 11A shows a portion of the viewable image generated by rendering the multiplane image (422) obtained from the "playing violinist" input multiplane image (200) corresponding to FIG. 10A. FIG. 11B shows the same portion of the viewable image generated by rendering the output multiplane image (440). Comparison of the outlined areas of the image shown in FIG. 11A with the corresponding areas of the image shown in FIG. 11B provides a visual indication of the extent to which the "object-boundary" and "blurring" artifacts can be corrected by the texture-channel scaling of the third processing block (430) of the method (400).

Example Hardware

Figure 12:
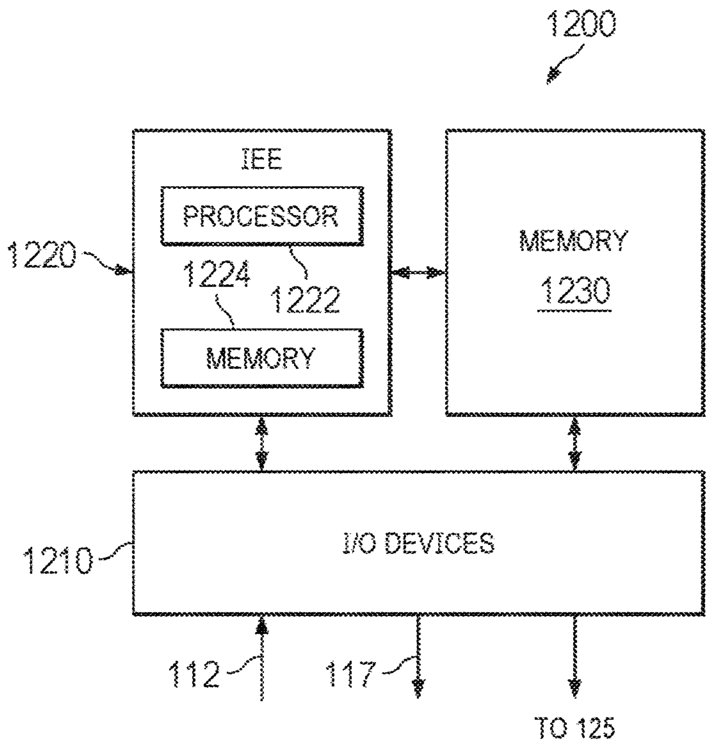
FIG. 12 is a block diagram illustrating a computing device according to an embodiment.

FIG. 12 is a block diagram illustrating a computing device (1200) according to an embodiment. The device (1200) can be used, e.g., at the post-production block (115). The device (1200) comprises input/output (I/O) devices (1210), an image-enhancement engine (IEE, 1220), and a memory (1230). The I/O devices (1210) may be used to enable the device (1200) to receive at least a portion of the video/image production stream (112) and to output at least a portion of the final video/image stream (117). The I/O devices (1210) may also be used to connect the device (1200) to the reference display (125).

The memory (1230) may have buffers to receive the input multiplane image (200), e.g., by way of the video/image production stream (112). The input multiplane image (200) may be, e.g., in the form of an image file. Once the input multiplane image (200) is received, the memory (1230) may provide the image file to the IEE (1220) for processing therein. The IEE (1220) includes a processor (1222) and a memory (1224). The memory (1224) may store therein program code, which when executed by the processor (1222) enables the IEE (1220) to perform the method (400). The program code may include, inter alia, the program code embodying the various pseudocodes described above. Once the IEE (1220) converts the input multiplane image (200) into the corresponding output multiplane image (440) by executing the method (400), the IEE (1220) may perform rendering processing thereof and provide the corresponding viewable image for being viewed on the reference display (125). The viewable image can be, e.g., in the form of a suitable image file outputted through the I/O devices (1210).

According to an example embodiment disclosed above, e.g., in the summary section and/or in reference to any one or any combination of some or all of FIGS. 1-12, provided is an apparatus for enhancing a first multiplane image represented by a plurality of layers corresponding to different respective distances from a reference camera position, the apparatus comprising: at least one processor (e.g., 1222, FIG. 12); and at least one memory (e.g., 1224, FIG. 12) including program code; and wherein the at least one memory and the program code are configured to, with the at least one processor, cause the apparatus at least to: for each pixel of a first set of pixels, scale respective weights of the layers (e.g., STEP-2, FIG. 6) to cause a sum of scaled weights to be equal to a predetermined fixed value; for each pixel of a second set of pixels, replace respective alpha and texture values in the layers (e.g., STEP-2, FIG. 8) by corresponding local average values; and for each pixel of a third set of pixels, scale corresponding texture values in the layers (e.g., STEP-1, FIG. 9) such that, for a resulting viewable image rendered for the reference camera position, texture values of each pixel of the third set match respective texture values of a reference image captured from the reference camera position. In various embodiments, the predetermined fixed value can be one or other suitably selected, positive fixed value.

In some embodiments of the above apparatus, the second set is an empty set. The second set of pixels is empty, e.g., when no "black hole" artifacts are present. The first and third sets of pixels are typically not empty.

In some embodiments of any of the above apparatus, the at least one memory and the program code are configured to, with the at least one processor, further cause the apparatus to generate a second multiplane image (e.g., 412, FIG. 4) at least by: converting alpha values of the first multiplane image into corresponding weight values (e.g., STEP-i, FIG. 6); identifying the first set of pixels based on said corresponding weight values; and computing alpha values for the second multiplane image using the scaled weights (e.g., STEP-3, FIG. 6).

In some embodiments of any of the above apparatus, the at least one memory and the program code are configured to, with the at least one processor, further cause the apparatus to compute the alpha values for the second multiplane image by recursive backpropagation of the scaled weights (e.g., Eqs. (19)-(22)).

In some embodiments of any of the above apparatus, the at least one memory and the program code are configured to, with the at least one processor, further cause the apparatus to identify the second set of pixels by at least finding one or more null texture values in a viewable image generated based on the second multiplane image (e.g., Eq. (23)).

In some embodiments of any of the above apparatus, the at least one memory and the program code are configured to, with the at least one processor, further cause the apparatus to generate a third multiplane image (e.g., 422, FIG. 4) based on the second multiplane image, the second set of pixels of the third multiplane image having the corresponding local average values as pixel values therein.

In some embodiments of any of the above apparatus, the at least one memory and the program code are configured to, with the at least one processor, further cause the apparatus to perform alpha-channel normalization for the third multiplane image (e.g., STEP-3, FIG. 8).

In some embodiments of any of the above apparatus, the at least one memory and the program code are configured to, with the at least one processor, further cause the apparatus to perform alpha-to-weight conversion for the alpha-channel normalization.

In some embodiments of any of the above apparatus, the at least one memory and the program code are configured to, with the at least one processor, further cause the apparatus to generate a fourth multiplane image (e.g., 440, FIG. 4) based on the third multiplane image, the third set of pixels of the fourth multiplane image having alpha and texture values causing the match.

In some embodiments of any of the above apparatus, the at least one memory and the program code are configured to, with the at least one processor, further cause the apparatus to generate another viewable image by rendering the fourth multiplane image for a virtual camera position different from the reference camera position.

According to another example embodiment disclosed above, e.g., in the summary section and/or in reference to any one or any combination of some or all of FIGS. 1-12, provided is a method for enhancing a first multiplane image represented by a plurality of layers corresponding to different respective distances from a reference camera position, the method comprising the steps of: for each pixel of a first set of pixels, scaling respective weights of the layers (e.g., STEP-2, FIG. 6) to cause a sum of scaled weights to be a predetermined fixed value, the scaling of the respective weights being performed with at least one processor (e.g., 1222, FIG. 12) and at least one memory (e.g., 1224, FIG. 12) including program code; for each pixel of a second set of pixels, replacing respective alpha and texture values in the layers (e.g., STEP-2, FIG. 8) by corresponding local average values, the replacing being performed with the at least one processor and the at least one memory; and for each pixel of a third set of pixels, scaling corresponding texture values in the layers (e.g., STEP-1, FIG. 9) such that, for a resulting viewable image rendered for the reference camera position, texture values of each pixel of the third set match respective texture values of a reference image captured from the reference camera position, the scaling of the corresponding texture values being performed with the at least one processor and the at least one memory.

In some embodiments of the above method, the method further comprises generating a second multiplane image (e.g., 412, FIG. 4) at least by: converting alpha values of the first multiplane image into corresponding weight values (e.g., STEP-1, FIG. 6); identifying the first set of pixels based on said corresponding weight values; and computing alpha values for the second multiplane image using the scaled weights (e.g., STEP-3, FIG. 6).

In some embodiments of any of the above methods, the method further comprises computing the alpha values for the second multiplane image by recursive backpropagation of the scaled weights (e.g., Eqs. (19)-(22)).

In some embodiments of any of the above methods, the method further comprises identifying the second set of pixels by at least finding one or more null texture values in a viewable image generated based on the second multiplane image (e.g., Eq. (23)).

In some embodiments of any of the above methods, the method further comprises generating a third multiplane image (e.g., 422, FIG. 4) based on the second multiplane image, the second set of pixels of the third multiplane image having the corresponding local average values as pixel values therein.

In some embodiments of any of the above methods, the method further comprises performing alpha-channel normalization for the third multiplane image (e.g., STEP-3, FIG. 8).

In some embodiments of any of the above methods, the method further comprises performing alpha-to-weight conversion for the alpha-channel normalization.

In some embodiments of any of the above methods, the method further comprises generating a fourth multiplane image (e.g., 440, FIG. 4) based on the third multiplane image, the third set of pixels of the fourth multiplane image having alpha and texture values causing the match.

In some embodiments of any of the above methods, the method further comprises generating another viewable image by rendering the fourth multiplane image for a virtual camera position different from the reference camera position.

According to yet another example embodiment disclosed above, e.g., in the summary section and/or in reference to any one or any combination of some or all of FIGS. 1-12, provided is a non-transitory computer-readable medium storing instructions that, when executed by a processor, cause the processor to perform operations comprising a method for enhancing a first multiplane image represented by a plurality of layers corresponding to different respective distances from a reference camera position, the method comprising the steps of: for each pixel of a first set of pixels, scaling respective weights of the layers (e.g., STEP-2, FIG. 6) to cause a sum of scaled weights to be a predetermined fixed value, the scaling of the respective weights being performed with at least one processor (e.g., 1222, FIG. 12) and at least one memory (e.g., 1224, FIG. 12) including program code; for each pixel of a second set of pixels, replacing respective alpha and texture values in the layers (e.g., STEP-2, FIG. 8) by corresponding local average values, the replacing being performed with the at least one processor and the at least one memory; and for each pixel of a third set of pixels, scaling corresponding texture values in the layers (e.g., STEP-1, FIG. 9) such that, for a resulting viewable image rendered for the reference camera position, texture values of each pixel of the third set match respective texture values of a reference image captured from the reference camera position, the scaling of the corresponding texture values being performed with the at least one processor and the at least one memory.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as or referred to as including "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

"BRIEF SUMMARY OF SOME SPECIFIC EMBODIMENTS" in this specification is intended to introduce some example embodiments, with additional embodiments being described in "DETAILED DESCRIPTION" and/or in reference to one or more drawings. "BRIEF SUMMARY OF SOME SPECIFIC EMBODIMENTS" is not intended to identify essential elements or features of the claimed subject matter, nor is it intended to limit the scope of the claimed subject matter.

The invention claimed is:

1. An apparatus for enhancing a first multiplane image represented by a plurality of layers corresponding to different respective distances from a reference camera position, the apparatus comprising:

at least one processor; and at least one memory including program code; and wherein the at least one memory and the program code are configured to, with the at least one processor, cause the apparatus at least to:

for each pixel of a first set of pixels, scale respective weights of the layers to cause a sum of scaled weights to be equal to a predetermined fixed value;

for each pixel of a second set of pixels, replace respective alpha and texture values in the layers by corresponding local average values; and for each pixel of a third set of pixels, scale corresponding texture values in the layers such that, for a resulting viewable image rendered for the reference camera position, texture values of each pixel of the third set match respective texture values of a reference image captured from the reference camera position.

2. The apparatus of claim 1, wherein the second set is an empty set.

3. The apparatus of claim 1, wherein the at least one memory and the program code are configured to, with the at least one processor, further cause the apparatus to generate a second multiplane image at least by:

converting alpha values of the first multiplane image into corresponding weight values;

identifying the first set of pixels based on said corresponding weight values; and computing alpha values for the second multiplane image using the scaled weights.

4. The apparatus of claim 3, wherein the at least one memory and the program code are configured to, with the at least one processor, further cause the apparatus to compute the alpha values for the second multiplane image by recursive backpropagation of the scaled weights.

5. The apparatus of claim 3, wherein the at least one memory and the program code are configured to, with the at least one processor, further cause the apparatus to identify the second set of pixels by at least finding one or more null texture values in a viewable image generated based on the second multiplane image.

6. The apparatus of claim 3, wherein the at least one memory and the program code are configured to, with the at least one processor, further cause the apparatus to generate a third multiplane image based on the second multiplane image, the second set of pixels of the third multiplane image having the corresponding local average values as pixel values therein.

7. The apparatus of claim 6, wherein the at least one memory and the program code are configured to, with the at least one processor, further cause the apparatus to perform alpha-channel normalization for the third multiplane image.

8. The apparatus of claim 7, wherein the at least one memory and the program code are configured to, with the at least one processor, further cause the apparatus to perform alpha-to-weight conversion for the alpha-channel normalization.

9. The apparatus of claim 6, wherein the at least one memory and the program code are configured to, with the at least one processor, further cause the apparatus to generate a fourth multiplane image (e.g., 440, FIG. 4) based on the third multiplane image, the third set of pixels of the fourth multiplane image having alpha and texture values causing the match.

10. The apparatus of claim 9, wherein the at least one memory and the program code are configured to, with the at least one processor, further cause the apparatus to generate another viewable image by rendering the fourth multiplane image for a virtual camera position different from the reference camera position.

11. A method for enhancing a first multiplane image represented by a plurality of layers corresponding to different respective distances from a reference camera position, the method comprising:

for each pixel of a first set of pixels, scaling respective weights of the layers to cause a sum of scaled weights to be a predetermined fixed value, the scaling of the respective weights being performed with at least one processor and at least one memory including program code;

for each pixel of a second set of pixels, replacing respective alpha and texture values in the layers by corresponding local average values, the replacing being performed with the at least one processor and the at least one memory; and for each pixel of a third set of pixels, scaling corresponding texture values in the layers such that, for a resulting viewable image rendered for the reference camera position, texture values of each pixel of the third set match respective texture values of a reference image captured from the reference camera position, the scaling of the corresponding texture values being performed with the at least one processor and the at least one memory.

12. The method of claim 11, further comprising generating a second multiplane image at least by:

converting alpha values of the first multiplane image into corresponding weight values;

identifying the first set of pixels based on said corresponding weight values; and computing alpha values for the second multiplane image using the scaled weights.

13. The method of claim 12, further comprising computing the alpha values for the second multiplane image by recursive backpropagation of the scaled weights.

14. The method of claim 12, further comprising identifying the second set of pixels by at least finding one or more null texture values in a viewable image generated based on the second multiplane image.

15. The method of claim 12, further comprising:

generating a third multiplane image based on the second multiplane image, the second set of pixels of the third multiplane image having the corresponding local average values as pixel values therein.

16. The method of claim 15, further comprising performing alpha-channel normalization for the third multiplane image.

17. The method of claim 16, further comprising performing alpha-to-weight conversion for the alpha-channel normalization.

18. The method of claim 15, further comprising generating a fourth multiplane image based on the third multiplane image, the third set of pixels of the fourth multiplane image having alpha and texture values causing the match.

19. The method of claim 18, further comprising generating another viewable image by rendering the fourth multiplane image for a virtual camera position different from the reference camera position.

20. A non-transitory computer-readable medium storing instructions that, when executed by a processor, cause the processor to perform operations comprising the method of claim 11.

* * * * *